(12) United States Patent
Klaiber et al.

(10) Patent No.: US 6,298,938 B1
(45) Date of Patent: Oct. 9, 2001

(54) LOCKING DEVICE FOR THE STEERING SYSTEM OF MOTOR VEHICLES

(75) Inventors: Tobias Klaiber, Vaihingen-Guendelbach; Ulrich Kappenstein, Knittlingen; Werner Schoenamsgruber, Schwieberdingen, all of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/555,411

(22) PCT Filed: Nov. 23, 1998

(86) PCT No.: PCT/DE98/03449

§ 371 Date: Apr. 15, 2000

§ 102(e) Date: Apr. 15, 2000

(87) PCT Pub. No.: WO99/28153

PCT Pub. Date: Jun. 10, 1999

(30) Foreign Application Priority Data

Nov. 27, 1997 (DE) .............................. 197 52 519

(51) Int. Cl.[7] .................................. B60R 25/02
(52) U.S. Cl. .................. 180/287; 70/186; 74/411.5
(58) Field of Search ................... 180/287, 400; 70/183, 184, 185, 186, 187, 188, 189; 74/411.5

(56) References Cited

U.S. PATENT DOCUMENTS 3,903,986 * 9/1975 Smith .................... 180/287
4,647,229 * 3/1987 Melugin ................. 70/186
6,000,489 * 12/1999 Rick ..................... 70/186
6,035,675 * 3/2000 Zimmer et al. .......... 70/186
6,125,671 * 10/2000 Suzuki .................. 70/186

FOREIGN PATENT DOCUMENTS

| 195 00 682 | 2/1996 | (DE) . |
| 196 21 326 | 10/1997 | (DE) . |
| 196 50 751 | 11/1997 | (DE) . |
| 0 268 879 | 6/1988 | (EP) . |
| 0 499 001 | 8/1992 | (EP) . |
| 0 666 205 | 8/1995 | (EP) . |
| WO 89 09149 | 10/1989 | (WO) . |

* cited by examiner

Primary Examiner—J. J. Swann
Assistant Examiner—Christopher Bottorff
(74) Attorney, Agent, or Firm—Kenyon & Kenyon

(57) ABSTRACT

A locking device for use in motor-vehicle steering systems, the locking device having a blocking mechanism by which a pitman arm shaft can be locked, a steering wheel of the motor vehicle can be prevented from rotating and vehicle wheels of the motor vehicle can be prevented from being turned or steered. The blocking mechanism includes two end positions, one of which is unlocked and one of which is locked, and is electromechanically operable. An electromagnet causes concentric external gear teeth of the pitman arm shaft to mesh with internal gear teeth of an axially movable and radially non-rotatable locking ring so that the pitman arm shaft is not rotatable in the locked state.

11 Claims, 1 Drawing Sheet

LOCKING DEVICE FOR THE STEERING SYSTEM OF MOTOR VEHICLES

FIELD OF THE INVENTION

The present invention relates to a locking device for steering systems of motor vehicles.

BACKGROUND INFORMATION

It is well known that motor vehicles may be equipped with devices for preventing unauthorized use. For this purpose, some motor vehicles may have a mechanical locking device for the steering system.

In this connection, a steering system is mechanically locked and unlocked using the ignition key, which actuates a cam (an eccentric) and a spring-loaded slide bar. The slide bar is moved axially by turning the ignition key in the ignition lock, on whose end an eccentric disk is seated. A spring continuously presses this slide bar into the locked end position. In turn, a nose on the slide bar moves a locking gear rim into gear teeth of the steering gear shaft (a pitman arm shaft). Depending on the end position of the slide bar, the steering system is either freely rotatable or locked. If the ignition key is pulled out, the steering system is locked. This ensures that the key cannot be mistakenly pulled out in the unlocked position.

If the steering system is to be unlocked, the key must first be slid into the steering lock. After the key is inserted and turned, the eccentric disk presses the slide bar out of its spring-actuated, locked end position. The pitman arm shaft is released and is, therefore, freely rotatable. The steering system is locked by pulling the ignition key out of the ignition lock. In this way, the eccentric disk releases the slide bar, which is slid into the locked end position by a spring.

Since such steering locking systems are operated in a purely mechanical manner, and also need a key having a conventional bit in order to be operated, they may not be integrable into an electronic driving-authorization system with code input.

SUMMARY OF THE INVENTION

The present invention is based on the object of producing a locking device for motor-vehicle steering systems, which is simply constructed and distinguishes itself through a high level of operator-friendliness.

The locking device according to an exemplary embodiment of to the present invention offers the advantage of a locking device produced with few mechanical parts, which is electromechanically controlled, preferably using electromagnets, and which therefore becomes advantageously accessible to an electronic control system. And also it can be integrated into an electronic immobilizer system without requiring a conventional ignition key along with a lock cylinder.

DETAILED DESCRIPTION

Figure 1:
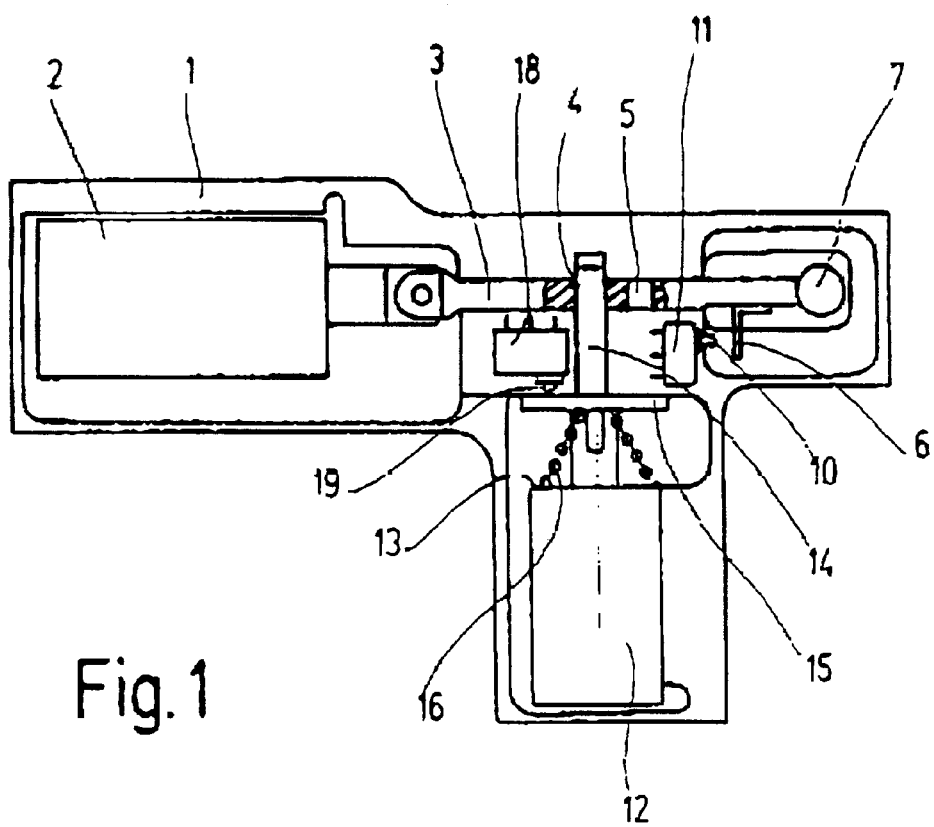
FIG. 1 shows a sectional view indicating the component parts of a steering system lock.

FIG. 1 shows a sectional view showing the arrangement of the component parts of a steering system lock. Two electromagnets 2 and 12 can be seen in FIG. 1, whose lifting axes are at an angle of 90° to each other. In this case, electromagnet 2 is dimensioned larger than electromagnet 12. For example, the lifting force of magnet 2 can be approximately 20 N, while that of magnet 12 can be approximately 3 N. Both electromagnets 2 and 12 are fixed in a common housing 1, which is securely joined to vehicle body 24. However, this connection is not shown here in further detail. Electromagnet 2 is operatively joined to an oblong slide bar 3 and can move this axially by applying a voltage. Slide bar 3 has two openings 4 and 5 that are, for example, in the form of bores. A locking bolt 14, which is joined to electromagnet 12 and can be moved axially by it, can engage with each of openings 4 and 5. Only when a voltage is applied to electromagnet 12, does it pull locking bolt 14 against the spring force of a compression spring 16, which is supported between a shoulder 15 of locking bolt 14 and an end face 13 of the housing of electromagnet 12, and is expediently designed as a helical spring. In this manner, locking bolt 14 releases slide bar 3. Only then can electromagnet 2 move slide bar 3 axially. To sense the actual position of slide bar 3, this has an angular bracket 6, which presses or releases head 10 of a pressure switch 11. In the same manner, a pressure switch 18 is mounted at locking bolt 14, head 19 of the pressure switch being pressed down by shoulder 15 of locking bolt 14 in response to electromagnet 12 being switched off. Head 19 of switch 18 is only released when a voltage is applied to electromagnet 12. In this manner, switch 18 supplies information on the current position of locking bolt 14. Slide bar 3 has a head 7 at its end.

Figure 2:
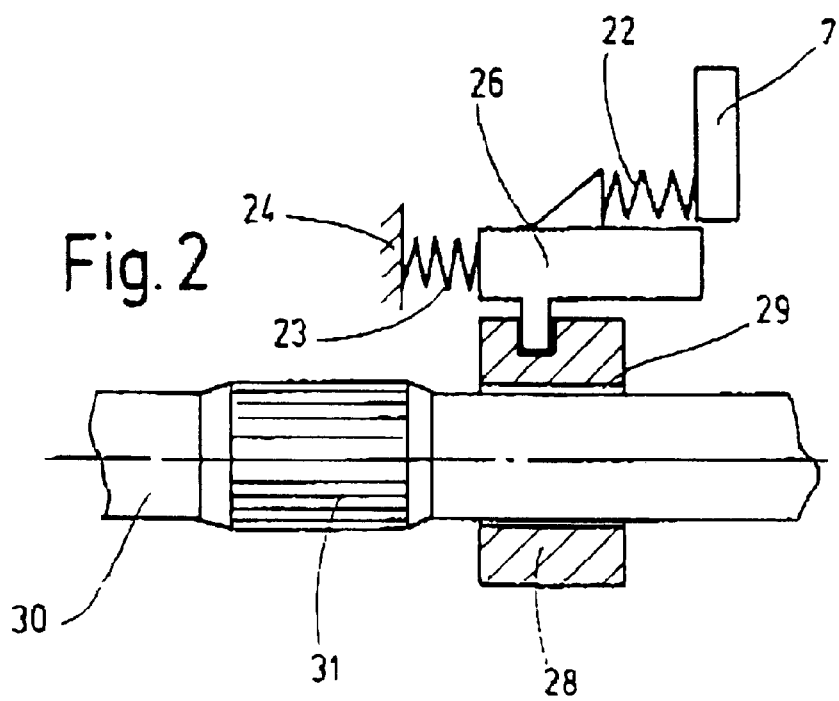
FIG. 2 shows a representation of the locking of a steering column.

As shown more precisely in FIG. 2, this head 7 is joined via a spring 22 to a slide bar 26, which is fastened to the steering column and can be moved parallelly to the axis of pitman arm shaft 30. Slide bar 26 moves a locking ring 28, which embraces pitman arm shaft 30, and whose internal gear teeth 29 can mesh with matching external gear teeth 31 applied to (or put onto) pitman arm shaft 30.

Starting from the original position of an unlocked steering system, the following is intended to elucidate the operation of the steering system lock, using FIGS. 1 and 2.

In order to lock the steering system, a voltage must initially be applied to electromagnet 12. As a result, locking bolt 14 is moved against the spring force of spring 16 and consequently releases slide bar 3. The current end position of locking bolt 14 is permanently sensed by switch 18. Slide bar 3, which is guided in housing 1, executes a longitudinal stroke after electromagnet 2 is switched on. Slide bar 26, which is seated in the steering column and engages with locking ring 28, is moved axially on pitman arm shaft 30 and, therefore, locks pitman arm shaft 30. If the applied voltage is switched off, spring 23 pushes the entire mechanism back into its original position again. If the "reaching of the end" position is signaled at switch 11 after slide bar 3 executes the stroke, the voltage at magnet 12 must be switched off. Spring 16 presses locking bolt 14 into its front end position and thus secures slide bar 3 in its attained end position. A switch 18 signals this. The consequently reached end position of the locked steering system is simultaneously the new starting position.

To unlock the steering system, a voltage is initially applied to electromagnet 2, and then to electromagnet 12. After the voltage at electromagnet 2 has been switched off, the mechanism travels back into its starting position. Now the voltage at electromagnet 12 can also be switched off. Spring 16 presses locking bolt 14 into its front end position, and consequently secures slide bar 3 in its attained end position. This, in turn, is signaled by switch 18. Thus, the steering system is released again.

Apart from these two provided states, the situation can occur during operation, in which the control device triggers a locking of the steering system, but the gear teeth on pitman arm shaft 30 and locking ring 28 are not aligned with each other, and therefore cannot intermesh. However, the steering system must also be lockable in such a position. First, the steps are carried out as described above. If the special case now occurs, in which the gear teeth do not intermesh, locking ring 28 contacts the gear teeth of pitman arm shaft 30 under the initial force of spring 22. The next time the steering wheel is turned in any direction, locking ring 28 meshes with the gear teeth of pitman arm shaft 30. In this case, the spring force of spring 22 is noticeably greater than that of spring 23 to ensure that the mechanism does not recoil.

What is claimed is:

1. A locking device for a steering system of a motor vehicle, the locking device comprising:

a first compression spring;

a second compression spring;

an electromagnet;

a pitman arm shaft having concentric external gear teeth;

a locking ring having internal gear teeth, the locking ring being assigned to the concentric external gear teeth, the locking ring being supportable to be movable by the electromagnet along an axis of the pitman arm shaft, and the internal gear teeth being meshable with the concentric external gear teeth so that the pitman arm shaft is not rotatable in a locked state; and a blocking mechanism for locking the pitman arm shaft, for preventing a steering wheel of the motor vehicle from rotating and for preventing vehicle wheels of the motor vehicle from being steered, the blocking mechanism being electromechanically displaceable between an unlocked end position and a locked end position;

wherein forces free appliable to the locking ring by the first compression spring acting in a locking direction and by the second compression spring acting in an unlocking direction, a first spring force of the first compression spring being greater than a second spring force of the second compression spring, and being less than a lifting force of the electromagnet acting in the locking device.

2. The locking device of claim 1, wherein:

the electromagnet causes the concentric external gear teeth to mesh with the internal gear teeth so that the pitman arm shaft is not rotatable in the locked state; and the locking ring is axially movable and radially non-rotatable.

3. The locking device of claim 2, wherein the locking ring embraces the pitman arm shaft and is movable axially by the electromagnet via a slide bar.

4. The locking device of claim 3, wherein another slide bar, located between the slide bar and the locking ring, is used as at least one of a transmission element and a transfer element and is supported in an axial direction of movement between the first compression spring and the second compression spring that act against each other.

5. The locking device of claim 4, wherein:

the another slide bar is supportable by the second compression spring at at least one of a housing and a vehicle body; and the another slide bar is connectable to the slide bar via the first compression spring.

6. The locking device of claim 5, further comprising a locking bolt engageable perpendicularly with each of two openings of the slide bar, wherein the locking bolt is axially actuateable perpendicularly to a direction of movement of the slide bar caused by the electromagnet, in opposition to another spring force of another compression spring so that the locking bolt one of releases the slide bar and engages one of the two openings of the slide bar to lock the slide bar in one of two positions.

7. The locking device of claim 1, further comprising a locking bolt engageable perpendicularly with each of two openings of a slide bar.

8. The locking device of claim 7, wherein the locking bolt is axially actuateable perpendicularly to a direction of movement of the slide bar cause by the, electromagnet, in opposition to another spring force of another compression spring so that the locking bolt one of releases the slide bar and engages one of the two openings of the slide bar to lock the slide bar in one of two positions.

9. The locking device of claim 8, further comprising:

a first end switch for detecting a current position of the slide bar; and a second end switch for detecting a current position of the locking bolt.

10. The locking device of claim 9, further comprising: another electromagnet, wherein operation of the electromagnet and the another electromagnet is electronically controlled and monitored.

11. The locking device of claim 10, wherein the locking device is integrated with an electronic immobilizer system of the motor vehicle.

\* \* \* \* \*